Sept. 10, 1935.                 A. BOUSFIELD                   2,014,275
                 MEANS FOR INCREASING THE CAPACITY OF SCALES
                    Filed July 24, 1933        2 Sheets-Sheet 1
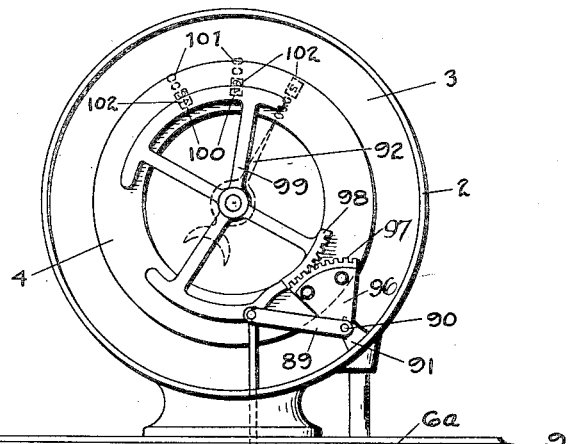
Fig.1.
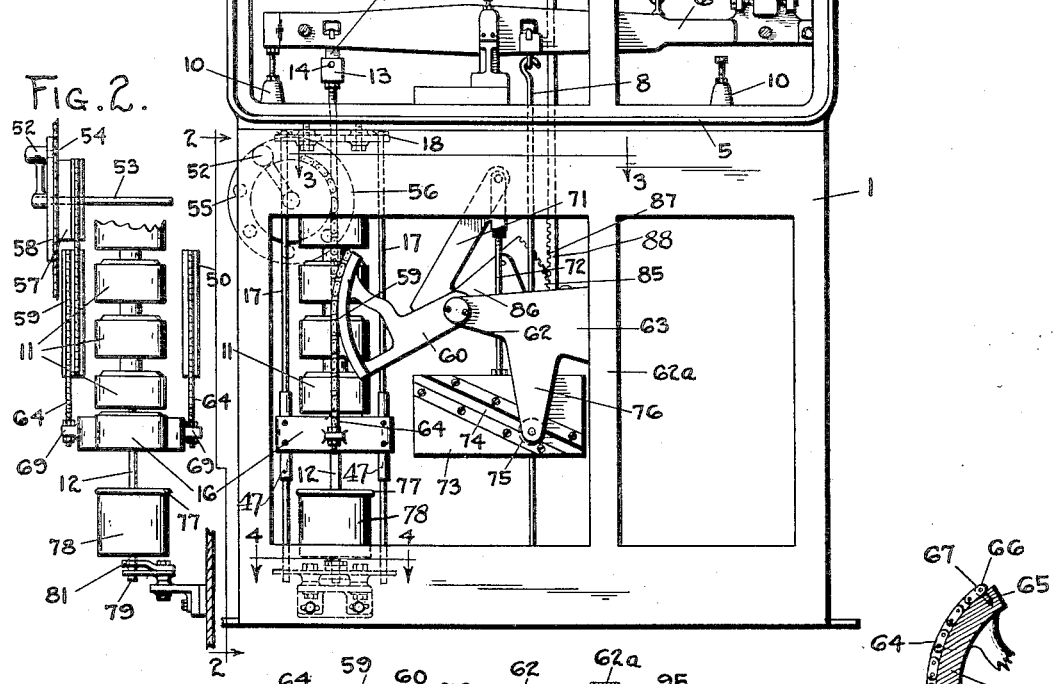
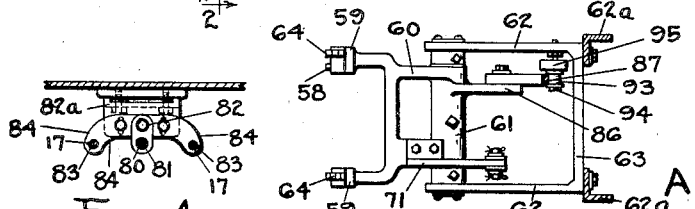
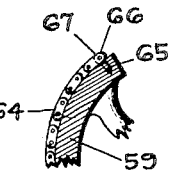
INVENTOR
ALFRED BOUSFIELD
BY
ATTORNEY Sept. 10, 1935.  A. BOUSFIELD  2,014,275
MEANS FOR INCREASING THE CAPACITY OF SCALES
Filed July 24, 1933  2 Sheets-Sheet 2
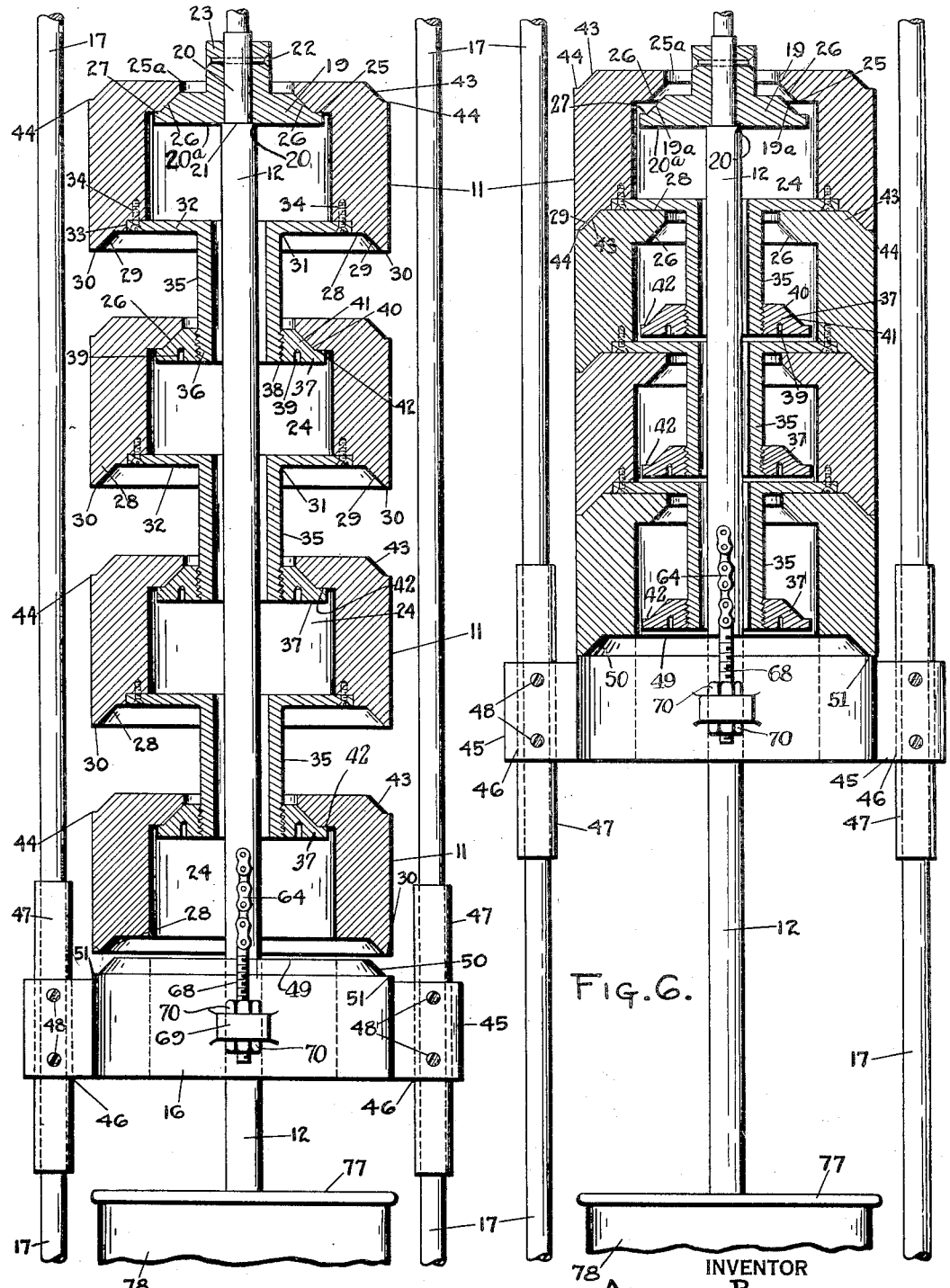
INVENTOR
ALFRED BOUSFIELD
BY
Franklin J. Bisbee
ATTORNEY Patented Sept. 10, 1935

2,014,275

UNITED STATES PATENT OFFICE 2,014,275

MEANS FOR INCREASING THE CAPACITY OF SCALES

Alfred Bousfield, St. Johnsbury, Vt.

Application July 24, 1933, Serial No. 681,868

10 Claims. (Cl. 265—48)

This invention relates to weighing scales in which a series of unit or counterpoise weights are employed to increase the capacity of the scale above its normal capacity.

A primary object of the invention is to provide simple and efficient counterpoise means for transferring and adding successively unit weights to the scale beam in order to counter-balance the increased load and to add the weight value of the increased load to the capacity of the scale.

Another primary object is the provision of a series of interdependent unit weights mounted on a rod suspended from the beam and having centrally aligned telescopic means for connecting and suspending each unit weight from its preceding unit weight.

Another primary object is to provide each unit weight interconnecting means with a central radially extending member adapted to engage and hold the succeeding unit weight in suspension thereon.

Still another primary object is to provide the interconnecting radially extending member with means co-operating with the succeeding unit weight for automatically centralizing the succeeding unit weight in position thereon.

Another object is to provide each unit weight with means for automatically aligning and nesting the unit weights in their closed position.

Another object is to provide the unit weight suspension rod with fixed suspension means thereon for supporting and carrying the entire series of unit weights.

Another object is to provide guiding means for the unit weight suspension rod adapted to maintain the rod constantly in a vertical position.

Another object is to provide a movable carrier for supporting the series of unit weights as well as moving the unit weights in and out of their operative positions.

Another object is to provide control means for raising and lowering the unit weight carrier, together with means for locking temporarily in a fixed position the control means and unit weight carrier with the unit weights thereon.

A still further object is to provide pivotally mounted sectors flexibly connected to the carrier and control means for operating the carrier, as well as dial connecting means for connecting the unit weight mechanism and transmitting the unit weight values to the increased capacity indicating dial.

A still further object is to provide the carrier operating sector mechanism with a pivotally mounted counter-balance or counter-weight for offsetting the weight of the unit weights.

In order that the nature of my invention may be fully understood, I have illustrated certain embodiments of the invention in the accompanying drawings, in which,—

Figure 1 is a vertical elevation of the back of a scale embodying my invention, with parts of the housing removed in order to show the scale mechanism and the unit weights in operative position.

Figure 2 is a vertical end elevation partly in section on the line 2—2 of Fig. 1, showing the carrier operating handle and unit weight carrier mechanism.

Figure 3 is a plan of the unit weight operating mechanism on the line 3—3 of Fig. 1, showing the carrier operating sectors and cooperating parts.

Figure 4 is a detached plan, on the line 4—4 of Fig. 1, showing the base plate for holding the spaced rods on which the unit weight carrier slides.

Figure 5 is an enlarged fragmentary view, partly in section, showing a portion of the arcuate face of one of the carrier operating sector arms and the flexible connecting chain pivotally secured thereto.

Figure 6 is an enlarged vertical elevation, partly in section, showing all the unit weights raised to their nested, inoperative position and held free of the unit weight suspension rod.

Figure 7 is a similar enlarged vertical elevation, partly in section, showing all the unit weights in their operative position.

It is to be noted that while the unit weights and co-operating mechanism of the present invention are shown as applied to a dial scale, they may be used as well on a beam scale, for the same purpose of increasing the capacity of the scale.

Referring to the drawings 1 designates the scale frame with the cover plates removed, in which the weighing mechanism and unit weight mechanism are located. Surmounting the scale frame is a circular dial frame 2, within which are mounted the main or fixed dial 3 and annular auxiliary revolvable dial 4, coaxially mounted with the main dial, together with the usual automatic load counterbalancing mechanism, which is not shown. Mounted on a shelf 5 is the weigh beam 6, fulcrumed on the beam support 7 and connected by the pivotally mounted beam rod 8 to the usual lever system supporting a platform, not shown, as well as to main dial 4 by the connecting rod 6a.

The lever system, main and auxiliary dials, and automatic load counterbalancing mechanism employed are shown in detail in Patent No. 1,882,456, Morton H. Starr, Oct. 11, 1932. The beam 6 is provided at one end with the usual balance ball 9, while adjustable beam stops 10 below each end of the beam serve to limit the downward movement of the beam.

The mechanism for increasing the capacity of the scale comprises essentially a series of counterpoise or unit weights as shown in Fig. 1, which are suspended from the butt end of the beam 6 on a unit weight rod 12 secured to a U-shaped shackle 13, which is swivelly disposed on a transverse pin 14 carried by a bearing loop 15, pivotally mounted in the beam 6. The unit weights 11, which are preferably circular in form, are of equal size and weight varying in accordance with the total capacity of the scale and are adapted to telescopically interfit and co-operate with each other in adding increased weight capacities to the dial weight indication (Fig. 7). Thus each unit weight added to the weight suspended from the beam 6 is adapted to increase the capacity of the scale by an amount equivalent to the maximum capacity of the fixed dial, the total capacity of the scale being, therefore, in proportion to the number of unit weights used. In the scale illustrating the invention, as shown in Fig. 1, the main dial 3 is arranged for a capacity of 1000 pounds and each unit weight 11 for an added capacity of 1000 pounds, providing thereby a total capacity of 5000 pounds. Various capacities may be arranged in like manner for the main dial 3 and drop weights 11 in hundreds or thousands of pounds, graduating the weight of the unit weights accordingly. Normally the unit weights are disconnected from the weighing mechanism by being raised to their inoperative positions, as shown in Fig. 6, on a carrier 16, slidably mounted on spaced vertical guide rods 17, fixedly secured by their upper ends in a bracket 18 attached to the frame 1, while the carrier likewise serves to move and place the unit weights successively in their operative positions as shown in Fig. 7. The entire series of unit weights 11 is suspended from a circular supporting disc 19, as hereinafter described, the disc 19 being mounted on a reduced portion 20 on the rod 12 and resting on the shoulder 21 formed thereon, (Fig. 7) while the disc 19 is held in a fixed position by a pin 22 inserted in a boss portion 23 extending upwardly from the disc 19 and through the rod 12. The disc 19 is provided with a beveled rim 19a and flat annular base portion 20a leading therefrom which co-operate with similarly shaped parts of the top unit weight as described below.

Each unit weight 11 (Figs. 6 and 7) is provided with a circular interior chamber 24 provided with an upper circular portion 25 of reduced diameter, with a top circular opening 25a leading therefrom to the top of the unit weight. The circular portion 25 has its rim 26 beveled with an annular flat portion 27 extending from its base, while the base of the unit weight 11 is provided with a circular recess 28 of greater diameter than the chamber 24 and having a beveled rim 29 with an annular flat portion 30 extending from the base. In order to provide interconnecting means between the various unit weights 11, which means is also adapted to hold the succeeding unit weight in suspension thereon, there is fixedly mounted in the base of each unit weight below the chamber 24a depending unit weight connection 31 including a laterally extending annular flange 32 seated in a circular recess 33 located above the recess 28 and leading therefrom, and secured therein by screws 34. Extending downwardly from the flange 32 is a tubular member 35 surrounding the rod 12 and spaced therefrom so as to permit free movement of the tubular member 35 as it slides therealong. The tubular member 35 extends through the top circular opening 25a, in which it moves freely, and the interior chamber 24 of the succeeding unit weight, by which means the succeeding unit weight is telescopically mounted, as is each unit weight of the group of unit weights. Mounted on the threaded lower end 36 of the tubular member 35 is an annular radial supporting member 37, which is provided with a central threaded opening 38 engaging and secured to the threaded end 36 of the tubular member 35, while opposed spanner openings 39 in the base are provided for use with a spanner wrench in securing the radial member to the tubular member 35. The rim 40 of the radial member 37 is provided with an upper beveled portion 41 having at its base an annular flat portion 42, which are adapted when the particular unit weight is in its operative position, as shown in Fig. 7, to respectively engage and interfit with the beveled rim 26 of the interior chamber 24 and the annular portion 27. By the means described above the top unit weight 11 is seated and supported on the disc 19 through the interfitting of the beveled rim 19a and annular portion 20a with the beveled rim 26 and annular portion 27 of the top unit weight, while each of the succeeding unit weights 11 is seated on and held by the radial supporting member 37 of the preceding unit weight in its operative position, each unit weight moreover, being thereby automatically centralized in position on its supporting member 37 so that the unit weight will be evenly balanced on the radial supporting member 37. In this manner the entire series of unit weights is suspended and held individually and collectively in operative position to add to the capacity of the scale, as illustrated in Fig. 7.

For the purpose of nesting the series of unit weights 11 in their inoperative position, as shown in Fig. 6, the upper edge of each unit weight is provided with a beveled portion 43 having an annular flat portion 44 at its base, which portions 43 and 44 are adapted to engage and interfit respectively with the beveled rim 29 of the recess 28 and the adjacent annular flat portion 30 of the preceeding unit weight, the tubular member 35 and radial member 37 of which are adapted to enter and be completely enclosed within the chamber 24 of the succeeding unit weight. Thus the entire series of unit weights 11 is assembled in a compact and unified group.

The mechanism for supporting and moving the unit weights (Figs. 1–5) includes the carrier 16, which is annular in form and is provided with opposed radial bosses 45 having vertical circular openings 46 therein, in which tubes 47 are fixedly secured by set screws 48, and are slidably mounted on the spaced guide rods 17. Extending above the carrier 16 is an annular portion 49 provided with a beveled rim 50 and an annular flat portion 51 extending from the base of the rim, the beveled rim 50 and annular flat portion 51 being adapted to interfit with the beveled rim 29 of the recess 28 and adjacent flat portion 30 of the bottom unit weight (Fig. 7) in lowering and raising one or more of the unit weights to their operative and inoperative positions respectively.

The means for actuating the carrier 16 (Figs. 1-4) comprises a handle 52 mounted on a shaft 53 and carrying a spring actuated pin 54 adapted to engage a series of circular openings 55, one for each unit weight, in a fixed plate 56 (Figs. 2 and 3) mounted on the front of the scale housing. A drum 57 is mounted on the shaft 53 and carries a link chain 58, one end of which is secured thereon, the other end being attached to the lower end of one of a pair of sectors 59 carried by a sector bracket 60, the hub 61 of which is pivotally mounted on a shaft located in the spaced arms 62 of a bracket 63 attached to vertical opposed angle bars 62a secured to the scale frame 1. A link chain 64 is pivotally secured at one end to the upper end of each sector 59 by a screw 65 (Fig. 5) inserted therein and provided with a head 66 carrying a pin 67, on which the end of the link chain 64 is pivotally mounted. The other end of each link chain 64 is pivotally mounted on the end of a vertical adjusting screw 68 carried by each one of a pair of opposed lugs 69 extending from the side of the carrier 16 (Figs. 2 and 7). The adjusting screw 68 is provided with spaced lock nuts 70 above and below each lug 69, whereby the tension of each link chain 64 may be varied and properly adjusted. Extending upwardly from the hub 61 of the sector bracket 60 is an angularly disposed arm 71 having pivotally mounted at its free end a depending rod 72, to which a counterbalance weight 73 is secured, adapted to counterbalance the unit weights 11. In order to guide the counterbalance weight 73 and hold it in proper operative position (Fig. 1) it is provided with a diagonal groove or guideway 74, in which a roller 75, carried at the end of a depending arm 76 extending from the bracket 63, is adapted to slide and hold the counterbalance weight 73 at the position to which it is moved by the operation of the arm 71.

Fixedly mounted on the lower end of the unit weight rod 12 is a counterbalance weight 77 for offsetting the load of the scale platform and levers in adjusting and maintaining the beam 6 in its inoperative position at zero, which counter-balance weight comprises a tubular receptacle 78 filled with the proper amount of lead for counterbalancing the above parts. The tip end 79 of the unit weight rod 12 extends below the counterbalance weight 77 and is adapted to enter an enlarged circular opening 80 in a guide plate 81, which permits free movement therein of the tip end 79 of the rod 12, the guide plate 81 being secured to the center of a curved plate 82 (Fig. 4) adjustably attached to a bracket 82a, which is likewise adjustably attached to the front base plate of the frame 1, by which means transverse adjustment of the unit weight rod 12 may be made and the rod held and maintained constantly in a vertical position. The lower ends of the carrier guide rods 17 are inserted and held in slightly enlarged openings 83 in the spaced arms 84 of the adjustable base plate 82, whereby the guide rods 17 may be adjusted longitudinally and held in fixed spaced relation to each other.

In order to transmit the increased capacity of the unit weights 11 to the auxiliary rotatable dial 4, a toothed segment 85 (Fig. 1) is mounted on an arm 86 leading from the hub 61 of the sector bracket 60, the teeth of the segment 85 engaging a toothed rack 87 carried by a vertically disposed rod 88, which is pivotally attached to the free end of an actuating arm 89 secured to the inner end of a shaft 90 pivotally mounted in a boss 91 within the dial frame 2.

The depending rod 6a is connected to the beam 6 and gear mechanism, shown in the patent to Starr referred to above and is adapted to transmit the weight of a load from the beam to the indicator 92 of the main dial 3 for indicating the weight of the load thereon up to its capacity.

A freely revolving roller 93 mounted on a stud 94 in a disc 95 (Fig. 3) attached to the inner arm 62 of the bracket 63 is adapted to hold the toothed rack 87 in engagement with the toothed segment 85. The shaft 90 carrying on its inner end the actuating arm 89 has attached to its outer end a segment 96 having an arcuate toothed member 97 adjustably mounted thereon and adapted to mesh with a toothed segment 98 carried by a spider 99 on which the auxiliary dial 4, provided with uniformly spaced graduations 100, is mounted (Fig. 1) behind the main fixed dial 3, which dial is likewise provided with suitable graduations 101, and with equally spaced windows 102, in the proper one of which the weight indication transmitted by a particular unit weight 11 or group of weights is shown, the total load being ascertained by taking the weight indication of the main fixed dial 3 as registered by the indicator 92 in conjunction with the increased capacity weight indication of the auxiliary dial 4.

In operation, when a load of less than 1000 pounds is being weighed, which as previously stated, is the capacity of the main dial 3 of the scale illustrated, the indicator 92 (Fig. 1) will move to the proper graduation on the main dial 3 to indicate the weight of the load. However, when the load exceeds 1000 pounds the indicator 92 will move beyond all the graduations on the main dial 3. At this point the handle 52 with its adjustable pin 54 released, is moved by the operator along the plate 56, while the drum 57 turning with the handle causes the chain 58 connected to the carrier 16 to unwind and thus permit the carrier to descend, as previously described, thereby releasing one unit weight 11 at a time from the nested group of unit weights as shown in Fig. 6, beginning with the top unit weight 11 so as to engage the fixed supporting disc 19 attached to the unit weight rod 12 (Fig. 7). The pin 54 carried by the handle 52 is then inserted in the proper opening 55 in the plate 56 for the number of unit weights released, which means is adapted to hold the unit weights in their suspended position. Thus the capacity of each unit weight 11 is transmitted to the beam 6 and hence through the intervening mechanism to the auxiliary dial 4, any fractional part of 1000 pounds being indicated on the main dial 3. During this interval the auxiliary dial 4 has been caused to move so as to bring into view at the proper window 102 on the main dial 3 the weight graduation 100 on the auxiliary dial 4 representing the capacity or capacities of the unit weights added. Thus in the illustration given in Fig. 1 of the operative position of the unit weights and the corresponding position of the auxiliary dial 4, all the unit weights 11 are in position on the unit weight rod 12, thereby adding their total capacity of 4000 pounds to the weight indication of the main dial 3, which registrations indicate the total weight of the load as being 5000 pounds. When the weighing operation has been completed the pin 54 in the handle 52 is released and the handle turned back, thereby raising, as previously described, the series of unit weights 11 to their inoperative, nested position as shown in Fig. 6, the top unit weight being raised clear of the disc 19, thereby holding the group of unit weights free of the rod 12. The pin 54 is then inserted in the proper opening 55 to hold the unit weights in their raised position, while the co-operating vertical rod 88 and intervening mechanism of the toothed segment 97 and toothed segment 98 of the auxiliary dial 4, turn the auxiliary dial 4 back to its zero or inoperative position, as is the indicator 92 of the main dial 3 by means of the beam connecting rod and co-operating mechanism.

While I have shown and described the preferred embodiment of my invention it is to be understood that I do not desire to limit myself to the exact form of construction shown and described, as various modifications may be made that will come within the scope of the invention.

I claim:—

1. In a weighing scale, a weigh beam, means co-operating with the said beam for adding to the capacity of the scale including a series of co-operating unit weights, each unit weight being provided with an interior chamber and a reduced upper portion with an opening leading therefrom, and downwardly extending interconnecting means including a tubular member having at its upper end an annular flange secured to the base of the unit weight below the said interior chamber and having mounted at its lower end a radial supporting member slidably mounted within the interior chamber of the succeeding unit weight and adapted in its operative position to engage the rim of the said upper portion of the succeeding unit weight above its interior chamber and thereby telescopically connect and suspend each successive weight from the preceding unit weight.

2. In a weighing scale, a weigh beam having a depending rod attached thereto, a series of unit weights mounted on the said rod, each unit weight being provided with an interior chamber and a top opening of reduced diameter leading therefrom, interconnecting means carried by each unit weight including a radial supporting member co-operating with the succeeding unit weight, means carried by the said rod for supporting the said unit weights thereon, when in their operative position, including a supporting disc fixedly secured to a reduced portion on the upper part of the said rod and disposed within the interior chamber of the top unit weight and in its operative position adapted to engage the rim of the said reduced opening and thereby suspend the said unit weights from the said supporting disc.

3. In a weighing scale, a weigh beam having a depending rod attached thereto, a series of unit weights mounted on the said rod, each unit weight being provided with an interior chamber and a top opening of reduced diameter leading therefrom, interconnecting means carried by each unit weight including a radial supporting member co-operating with the succeeding unit weight, means carried by the said rod for supporting the said unit weights thereon, when in their operative position, including a supporting disc fixedly secured on the upper part of the said rod and disposed within the interior chamber of the top unit weight, each radial member and the supporting disc being provided with a beveled rim and a flat annular portion extending from its base, the upper portion above the interior chamber of each unit weight having the rim of its opening beveled with an annular flat position extending from its base, whereby in operative position the beveled rim and flat annular portion of each radial member and the supporting disc is adapted to engage and interfit with the said beveled rim and annular flat portion of the upper chamber portion of the co-operating unit weight, whereby each unit weight is seated on and automatically centralized in position on its supporting radial member.

4. In a weighing scale, a weigh beam, a series of unit weights adapted to co-operate with the said beam, each unit weight being provided with an interior chamber and depending connecting and supporting means for the succeeding unit weights, a beveled portion on the upper edge of the unit weight with an annular flat portion leading therefrom, the bottom of the base of each unit weight having a recess therein of greater diameter than the chamber and having a beveled rim and an annular flat portion extending therefrom, whereby in the inoperative or nested position of the unit weights the said beveled portion above each unit weight with its annular portion is adapted to interfit with the beveled rim and annular portion of the preceding unit weight whereby the series of unit weights may be nested together in a compact, unified group, while the connecting and supporting means is enclosed within the interior chamber of the succeeding unit weight.

5. In a weighing scale, a weigh beam provided with a suspension rod, a series of co-operating unit weights adapted to be successively suspended therefrom, a carrier for supporting and moving the said unit weights to and from their operative positions, and means for actuating and raising the carrier including pivotally mounted spaced sectors carried by a sector bracket, and means for counterbalancing the said unit weights including an arm extending upwardly from the said sector bracket and having pivotally attached to its free end a depending rod provided at its lower end with a counterbalance weight, and means for guiding and holding the said weight in its operative position.

6. In a weighing scale, a weigh beam, a suspension rod carried by the beam, a series of co-operating unit weights adapted to be successively connected to the said suspension rod, a main dial provided with spaced windows, an auxiliary dial, a carrier for supporting and moving the said unit weights to their operative and inoperative positions, means for actuating the carrier and adapted to cause the carrier to move each unit weight to its proper operative position on the suspension rod and thus add its respective increased capacity to the beam, the said actuating means including a pivotally mounted sector bracket provided with spaced sectors connected by flexible connectors to the said carrier, means for transmitting the increased capacity added by each unit weight to the auxiliary dial including a toothed segment mounted on the said sector bracket, a vertical rod carrying a toothed rack adapted to mesh with the said segment, a pivotally mounted, toothed segment operatively connected to the upper end of the said rod and engaging a toothed segment carried by the auxiliary dial, whereby under influence of the increased capacity weight added by one or more unit weights, the auxiliary dial will be rotated and the particular increased weight graduation brought into view at the proper window in the main dial.

7. In a weighing scale, a weigh beam, a suspension rod carried by the beam, a series of co-operating unit weights adapted to be successively connected to the said suspension rod, a main fixed dial provided with an indicator and equally spaced windows, an auxiliary rotatable dial co-axially mounted therewith and having uniformally spaced increased capacity weight graduations thereon, means operatively connecting the beam and indicator and adapted to operate the said indicator, a carrier for supporting and moving the said unit weights to their operative and inoperative positions, means for actuating the carrier and adapted to cause the carrier to move each unit weight to its proper operative position on the suspension rod and thus add its respective increased capacity to the beam, the said actuating means including a pivotally mounted sector bracket provided with spaced sectors connected by flexible connectors to the said carrier, means for transmitting the increased capacity added by each unit weight to the auxiliary dial including a toothed segment mounted on the said sector bracket, a vertical rod carrying a toothed rack adapted to mesh with the said segment, a pivotally mounted, toothed segment operatively connected to the upper end of the said rod and engaging a toothed segment carried by the auxiliary dial, whereby under influence of the increased capacity weight added by one or more unit weights, the auxiliary dial will be rotated and the particular increased weight graduation brought into view at the proper window in the main dial.

8. In a weighing scale, a weigh beam, means co-operating with the said beam for adding to the capacity of the scale including a plurality of interdependent unit weights, each unit weight being provided with an interior chamber, means for successively suspending the said unit weights from the beam including a connecting member comprised of a tubular member carrying at its upper end an annular flange attached to the base of each unit weight below the interior chamber and having at its lower end a radial supporting member disposed and reciprocably operable within the chamber of the succeeding unit weight, and recessed and beveled interfitting means carried by the base of the said radial supporting member and the upper portion of the chamber of the succeeding unit weight, whereby each unit weight may be automatically centralized and held in a fixed position on the radial member.

9. In a weighing scale, a weigh beam, means co-operating with the said beam for adding to the capacity of the scale including a plurality of interdependent unit weights, each unit weight being formed with an interior chamber and having at its top an upper opening with a beveled rim leading thereto and in its base an enlarged lower opening below and leading from the said interior chamber likewise provided with a beveled rim, and means for successively suspending the said unit weights from the beam including a tubular member extending downwardly from each unit weight into the interior chamber of the succeeding unit weight and provided with upper and lower, spaced radial flanges, the lower flange having a beveled edge and a flat annular portion extending therefrom, the upper flange being inserted in the base below the interior chamber and the lower flange being operatively in engagement with the beveled rim of the upper opening of the succeeding unit weight, and beveled interfitting means in the top of each unit weight and the base of the preceding unit weight adapted to co-operate with each other in automatically centralizing the unit weights and joining them together, whereby the unit weights will be automatically aligned and nested in their inoperative position.

10. In a weighing scale, a weigh beam, means co-operating with the said beam for adding to the capacity of the scale including a plurality of interdependent unit weights, each unit weight being provided with an interior chamber having in the top wall an upper opening provided with a beveled rim and an enlarged opening in the base below the interior chamber likewise provided with a beveled rim, means for successively suspending the said unit weights from the beam, centrally aligned interconnecting means carried by each unit weight including a connecting member comprised of a tubular portion provided at its ends with upper and lower radially extending flanges respectively, the upper flange being secured in the opening in the base of the unit weight and the lower flange being beveled and slidably disposed in the interior chamber of the succeeding unit weight and adapted in its operative position to engage the beveled rim of the upper opening in the succeeding unit weight, a unit weight rod pivotally suspended from the beam on which the unit weights are successively mounted, the rod extending through the successive tubular members and having at its upper end a radial member provided with a beveled edge and a flat annular portion extending therefrom and adapted to engage the beveled rim of the upper opening in the uppermost unit weight, whereby the unit weights may be suspended individually or collectively from the said beam, carrier means for supporting the said unit weights and moving them to their operative and inoperative positions, control means for raising and lowering the said unit weights, and means for temporarily locking the control means and carrier in a fixed position.

ALFRED BOUSFIELD.